United States Patent Office 3,378,541
Patented Apr. 16, 1968

3,378,541
METHOD FOR DEPOLYMERIZING CARRAGEENANS AND PRODUCTS PRODUCED THEREBY
Joseph A. Colquhoun, Prestonpans, and Eric T. Dewar, Dalkeith, Scotland, assignors to Warner-Lambert Pharmaceutical Company, Morris Plains, N.J., a corporation of Delaware
No Drawing. Filed Mar. 17, 1965, Ser. No. 440,605
9 Claims. (Cl. 260—209)

This invention relates to a new and novel therapeutic composition containing carrageenan. More particularly, the present invention relates to a therapeutic composition containing lambda-carrageenan and to a method for preparing carrageenans of reduced viscosity without substantial loss of the sulphate ester groups present in untreated carrageenan.

Carrageenan is known to be a complex mucilaginous polysaccharide-type material typically found in the gelatinous extract of certain marine plants of the class Rhodophyceae. Seaweeds, classified as carrageenan, are generally characterized by a relatively high percentage of organically bound ester sulfate groups ($ROSO_3^-$) in the range of about 20% to about 50% (calculated as $SO_3Na$) by weight of the dry mucilage processed. Carrageenan may be further characterized as a polymeric material composed of monosaccharide units such as D-galactose and 3,6-anhydro-D-galactose.

Although the molecular structure of carrageenan has not been completely defined, recent discoveries such as that of Smith et al. (Arch. Biochem. Biophys. (1953), 45, 232; (1954), 53, 192), suggest that carrageenan extracted from the seaweed *Chondrus crispus* is a mixture of at least two polysaccharides, namely kappa-carrageenan and lambda-carrageenan.

Kappa-carrageenan which may be isolated by its tendency to gel in the presence of potassium ions, has been assigned the following provisional structure (O'Neill, J. Amer. Chem. Soc. (1955), 77, 2837; 6324) based on an alternating chain of 1,3,-linked 3,6-anhydro-α-D-galactosyl units:

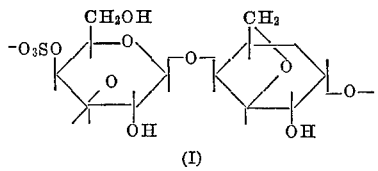

(I)

The structure of lambda-carrageenan has not been accurately defined but is believed by Morgan and O'Neill (Canad. J. Chem. (1959), 37, 201) to be composed of 1,3-linked α-D-galactose-4-sulphate residues in combination with other glycosidic linkages occurring in small amounts. More recently, however, Rees (J. Chem. Soc. (1963), 1821), suggested that lambda-carrageenin extracted from *Chondrus crispus* is structurally related to kappa-carrageenin.

Despite the incomplete knowledge of the structure of carrageenin, the kappa- and lambda-fractions may be readily distinguished by physical and chemical analysis. Lambda-carrageenin is characterized by a higher sulphate and higher galactose content than the kappa-fraction. These fractions may also be distinguished by the presence of 3,6-anhydrogalactose in the kappa-fraction which constituent appears to approach zero in the lambda-fraction.

Sulphated polysaccharides have been known to possess anti-enzyme action. For example, Levey and Sheinfeld (Gastroenterology (1954) 27, 625) found that the proteolytic action of pepsin on casein is inhibited by chondroitin sulphate, heparin, and sulphated sodium alginate. More recently, Anderson and Watt (J. Pharm. Lond. (1959), 11, 173; J. Physiol. (1959), 147, 528) reported that the incidence of ulcers in stress rats and in cortisone- and histamine-treated dogs and rats may be reduced by oral administration of depolymerized carrageenin. Carrageenin is administered in such instances in the depolymerized state because the reduced viscosity which results increases the dispersion of the polymer in the stomach (Anderson and Hargreaves, British Patent 840,623/60.

Kappa-carrageenin may be readily depolymerized by mild treatment with acid without appreciable loss of sulphate ester groups. Mild treatment with acid cleaves some of the reoccurring 3,6-anhydrogalactosyl units resulting in a product having reduced viscosity without substantial loss of sulphate ester groups.

Lambda-carrageenan is especially difficult to depolymerize with acid because of the almost complete absence of 3,6-anhydrogalactose and because of the relatively drastic conditions necessary to hydrolyze the galactopyranosyl linkages. The typical effect of such hydrolysis is removal of a high proportion of the sulphate ester residues.

It has now been found that by processing lambda-carrageenin according to the present invention results in a product having useful therapeutic application. The lambda-carrageenin so processed may be characterized by reduced viscosity and high sulphate ester content as based on the untreated carrageenin.

It is an object of this invention, therefore, to provide lambda-carrageenin of reduced viscosity and of increased therapeutic value.

It is also an object of this invention to provide a new therapeutic composition containing lambda-carrageenin characterized by reduced viscosity and relative increased sulphate ester content.

It is another object of this invention to provide a method for depolymerizing lambda-carrageenin without any substantial loss of the sulphate ester content.

It is an alternate object of this invention to provide an easily controlled method for depolymerizing kappa-carrageenin without any substantial loss of the sulphate ester content.

It is a further object of this invention to provide a method for oxidizing lambda-carrageenin in an aqueous solution to reduce the viscosity thereof without any substantial loss of the sulphate ester content for use in therapeutic compositions.

Other objects and advantages of the present invention will become more apparent from the following detailed description.

The present method for depolymerizing lambda-carrageenin without loss of sulphate ester is effected generally by oxidizing lambda-carrageenin in aqueous solution with hypochlorite ions. The mechanism of this reaction is not exactly known but appears to proceed in a complex manner with a proportion of the galactopyranosyl linkages of the lambda-carrageenin being cleaved by the hypochlorite. The present method also offers a simple alternative procedure for depolymerizing kappa-carrageenin in a more easily controlled manner than acid methods previously known.

Generally, the carrageenin to be treated is first dissolved in water having sufficient concentrate of hypochlorite ions to give a normality of about 0.01 to about 0.10 in the final solution. A normality of about 0.03 to about 0.05 is generally preferred.

Although the particular hypochlorite compound used to supply hypochlorite ions in the aqueous solution does not appear to be critical, sodium hypochlorite is the preferred compound.

After the period of oxidation at a temperature of about 15° C. to about 50° C. and preferably about 20° C., the excess hypochlorite may be destroyed with neutralizing reagents such as, for example, acetic acid and potassium iodide. The liberated iodine so formed may be titrated with sodium thiosulphate without the use of starch after which the solution may be dialyzed and concentrated to small volume. The depolymerized carrageenin may be then isolated as white powder by freeze-drying or related methods.

The extent of depolymerization of the carrageenin may be determined from the inherent viscosity of the carrageenin before and after treatment with hyprochlorite ions. The inherent viscosity, also known as the logarithmic viscosity number ($\eta_{inh.}$), when measured at 25° C. in an Ostwald viscometer with 0.1 molar sodium chloride as the solvent may be defined by the equation:

$$\eta_{inh.} = \frac{1}{c} \ln (\eta_{rel.})$$

wherein $c$ represents the grams of carrageenin in 100 milliliters of solution and $\eta_{rel.}$ represents the relative viscosity of the solution. When the above equation is used to define the inherent viscosity, the term may be conveniently expressed in units such as deciliters per gram (dl./g.). If the inherent viscosity is determined at various concentrations, then extrapolation of determined viscosity to zero concentration gives the limiting intrinsic viscosity.

The following examples are included to further illustrate the practice of the present invention.

EXAMPLE 2

Lambda-carrageenin (designated GP-λ) is prepared from the seaweed *Gigartina pistilllata*. The prepared carrageenin is found to have a specific rotation $[\alpha]_D$ of $+83°$ in water and an inherent viscosity of 20.6 dl./g. Analysis of the prepared lambda-carrageenin found 43.6% galactose ($C_6H_{10}O_5$), 41.0% ester sulphate ($SO_3Na$), and 4.2% of 3,6-anhydrogalactose. The lambda-carrageenin depolymerized by the method of Example 1 gave a series of degraded products having different inherent viscosities but with essentially the same sulphate ester content as set forth in the following table:

| Oxidation time (hr.) | NaOCl uptake (milliequiv./g.) | Degraded product | Yield (percent) | SO₃Na (percent) | $\eta_{inh.}$ |
|---|---|---|---|---|---|
| 1.0 | 1.32 | GP-λ-D3 | 92.0 | 42.5 | 2.23 |
| 1.5 | 1.48 | GP-λ-D4 | 91.0 | 40.6 | 1.58 |
| 1.75 | 1.64 | GP-λ-D5 | 90.0 | 40.7 | 1.04 |
| 2.0 | 1.86 | GP-λ-D6 | 86.9 | 40.9 | 0.72 |
| 4.0 | 2.08 | GP-λ-D7 | 87.5 | 40.1 | 0.65 |
| 24.0 | 4.60 | GP-λ-D9 | 89.5 | 39.1 | 0.19 |

EXAMPLE 3

Kappa-carrageenin (designated CY-K) is prepared from *Chondrus crispus* and unfractionated carrageenin (designated E) is isolated from the seaweed *Eucheuma spinosum*. The native and depolymerized products processed according to the procedure of Example 1 are given in the following table:

| Undegraded carrageenin | | Oxidation time (hr.) | NaOCl uptake (milliequiv./g.) | Degraded Product | Yield (percent) | SO₃Na (percent) | $\eta_{inh.}$ |
|---|---|---|---|---|---|---|---|
| SO₃Na (percent) | $\eta_{inh.}$ | | | | | | |
| CY-K  28.6 | 15.8 | 24 | 2.80 | CY-K-D1 | 78.4 | 29.6 | 0.25 |
| E  36.3 | 5.9 | 24 | 3.15 | E-D7 | 87.4 | 36.2 | 0.38 |
| | | 1.5 | 2.20 | E-D8 | 89.4 | 36.5 | 1.52 |

EXAMPLE 1

Lambda-carrageenin (designated CY-λ) is prepared from *Chondrus crispus* by the method described by Smith et al. (Canad. J. Chem. (1955), 33, 1352). The prepared carrageenin is found to have a specific rotation $[\alpha]_D$ of $+28°$ in water and an inherent viscosity of 16.2 dl./g. Analysis of the prepared lambda-carrageenin found 38.1% galactose ($C_6H_{10}O_5$), 38.1% ester sulphate ($SO_3Na$), and 3.6% of 3,6-anhydrogalactose.

5 gms. of lambda-carrageenin to be treated is dissolved in 800 ml. water. Thereafter, a sufficient amount of concentrated sodium hypochlorite is added to the system to give a normality of 0.04 in the final solution. The pH of the solution is adjusted to 7.0 with normal hydrochloric acid and the solution made up to one liter with water. After the required period of oxidation at 20° C., the excess hypochlorite is destroyed with 100 ml. of 2 N acetic acid and 10 gms. of potassium iodide. The liberated iodine is titrated with 2 N sodium thiosulphate without the use of starch and the solution is then dialyzed and concentrated to small volume under reduced pressure. The depolymerized product, isolated by freeze-drying as a white powder, is dried over phosphoric oxide at 60° C. and 0.1 mm. vacuum to constant weight.

Lambda-carrageenin depolymerized by the above method to give a series of degraded products having different inherent viscosities but with complete retention of the sulphate ester is set forth in the following table:

| Oxidation time (hr.) | NaOCl uptake (milliequiv./g.) | Degraded Product | Yield (percent) | SO₃Na (percent) | $\eta_{inh.}$ |
|---|---|---|---|---|---|
| 0.5 | 1.80 | CY-λ-D5 | 79.6 | 39.2 | 2.31 |
| 1.0 | 2.36 | CY-λ-D6 | 100 | 37.3 | 1.35 |
| 1.5 | 2.68 | CY-λ-D7 | 97.0 | 38.2 | 1.04 |
| 2.0 | 3.33 | CY-λ-D8 | 84.7 | 37.2 | 0.66 |
| 4.0 | 3.32 | CY-λ-D9 | 77.6 | 39.2 | 0.45 |

The depolymerized polysaccharides processed above are found to have complete retention of the sulphate ester.

For therapeutic use, the carrageenins prepared according to the practice of the present invention may be combined with conventional pharmaceutical carriers to form typical dosage units such as tablets, capsules, solutions, suspensions, suppositories and the like. These carrageenins so produced are found to exhibit good protective activity against histamine-induced gastric ulceration in the pylorus-ligated guinea pig. The produced carrageenins are also found to exhibit antiduodenal-ulcer activity.

It is to be understood that the foregoing detailed description is given merely by way of illustration and that many variations may be made therein without departing from the spirit of this invention.

What is claimed is:

1. A method for depolymerizing carrageenin without substantial loss of sulphate ester content which comprises, reacting carrageenin in an aqueous solution with an aqueous solution of hypochlorite ions in an amount sufficient to cleave galactopyranosyl linkages forming the carrageenin.

2. The method of claim 1 wherein the carrageenin is lambda-carrageenin.

3. The method claim 1 wherein the carrageenin is kappa-carrageenin.

4. A method for depolymerizing carrageenin without substantial loss of sulphate ester content which comprises, forming an aqueous solution containing carrageenin, adding to said solution an aqueous solution containing hypochlorite ions, oxidizing the carrageenin in said solution with the hypochlorite ions at a temperature of about 15° C. to about 50° C., neutralizing the hypochlorite ions to terminate depolymerization and thereafter isolating the processed carrageenin from the reaction mixture.

5. A method for depolymerizing lambda-carrageenin without substantial loss of sulphate ester content which comprises, reacting lambda-carrageenin extracted from *Chondrus crispus* with sodium hypochlorite in an aqueous solution, neutralizing the sodium hypochlorite in said solution after predetermined depolymerization of said carrageenin is effected and thereafter isolating lambda-carrageenin of reduced viscosity and of essentially the same sulphate ester content as the originally processed lambda-carrageenin.

6. A method of depolymerizing kappa-carrageenin without substantial loss of sulphate ester content which comprises, reacting kappa-carrageenin extracted from *Chondrus crispus* with sodium hypochlorite after predetermined depolymerization of said carrageenin is effected and thereafter isolating kappa-carrageenin of reduced viscosity and of essentially the same sulphate ester content as the originally processed kappa-carrageenin.

7. A method for depolymerizing lambda-carrageenin without substantial loss of sulphate ester content which comprises, reacting lambda-carrageenin extracted from *Gigartina pistillata* with sodium hypochlorite in an aqueous solution, neutralizing the sodium hypochlorite in said solution after predetermined depolymerization of said carrageenin is effected and thereafter isolating lambda-carrageenin of reduced viscosity and of essentially the same sulphate ester content as the originally processed lambda-carrageenin.

8. A method for depolymerizing carrageenin without loss of sulphate ester content which comprises, reacting carrageenin extracted from *Eucheuma spinosum* with sodium hypochlorite in an aqueous solution, neutralizing the sodium hypochlorite in said solution after predetermined depolymerization of said carrageenin is effected and thereafter isolating carrageenin of reduced viscosity and of essentially the same sulphate ester content as the originally processed carrageenin.

9. Depolymerized carrageenin prepared by the method of claim 1.

References Cited

UNITED STATES PATENTS

| | | | |
|---|---|---|---|
| 2,620,335 | 12/1952 | Nielsen et al. | 260—209 |
| 3,094,517 | 6/1963 | Standley | 260—209 |
| 3,176,003 | 3/1965 | Stancioff | 260—209 |

LEWIS GOTTS, *Primary Examiner.*
JOHNNIE R. BROWN, *Assistant Examiner.*